United States Patent [19]

Schoof et al.

[11] Patent Number: 4,895,350
[45] Date of Patent: Jan. 23, 1990

[54] AXLE MOUNT CONSTRUCTION FOR A FIBER REINFORCED RESIN LEAF SPRING

[75] Inventors: Walter W. Schoof, Milwaukee; James L. Wessel, Delafield, both of Wis.

[73] Assignee: A. O. Smith Corporation, Milwaukee, Wis.

[21] Appl. No.: 226,460

[22] Filed: Aug. 1, 1988

[51] Int. Cl.⁴ ............................................... F16F 1/30
[52] U.S. Cl. .......................................... 267/52; 267/53
[58] Field of Search ............................. 267/51, 52, 53; 280/112 A, 112 R

[56] References Cited

U.S. PATENT DOCUMENTS

| | | | |
|---|---|---|---|
| 379,839 | 3/1888 | White | 267/52 |
| 3,250,546 | 5/1966 | Allison | 267/52 |
| 4,598,900 | 7/1986 | Yamamoto et al. | 267/52 |
| 4,611,793 | 9/1986 | Nishiyama et al. | 267/52 |
| 4,630,804 | 12/1986 | Fesko | 267/52 |
| 4,637,595 | 1/1987 | Mishima et al. | 267/52 |
| 4,643,406 | 2/1987 | Mounier-Poulat | 267/52 |
| 4,684,110 | 8/1987 | Sale et al. | 267/52 |

OTHER PUBLICATIONS

"Detroit Notebook", *Brake and Front End*, Herb Carrier, Sep. 1985, pp. 27-29, and 56, vol. 55, No. 9.

Primary Examiner—Andres Kashnikow
Assistant Examiner—Matthew C. Graham
Attorney, Agent, or Firm—Andrus, Sceales, Starke & Sawall

[57] ABSTRACT

An axle mount construction for a fiber reinforced resin leaf spring which includes a clamping plate and a generally U-shaped clamping member. The clamping member has a web and side walls that define a longitudinal channel and flanges extend laterally from the side walls and are disposed flatwise against the side edges of the clamping plate. A pair of resilient rubber-like inserts are disposed within the channel and define a longitudinal passage to receive the leaf spring. Each insert includes a web and a pair of side walls. At least one side wall of the clamping member has an undulation and the corresponding side wall of the insert has a mating undulation. The web of the clamping member and the clamping plate have elongated openings and the outer surfaces of the webs of the resilient inserts have projections that are received in the openings. The ends of the inserts project longitudinally beyond the clamping members and are tapered inwardly toward the leaf spring.

11 Claims, 2 Drawing Sheets

AXLE MOUNT CONSTRUCTION FOR A FIBER REINFORCED RESIN LEAF SPRING

BACKGROUND OF THE INVENTION

Fiber reinforced resin leaf springs, commonly referred to as composite springs, are used in vehicle suspension systems and are composed of fibrous material, such as glass and/or graphite fibers, bonded by a thermosetting resin. The leaf springs can be formed by filament winding processes, compression molding or pultrusion processes.

Metal leaf springs are normally connected to the vehicle axle by an axle mount construction in which the leaf spring is positioned between a clamping plate and the axle, or between a clamping plate and a pad on the axle, and U-bolts secure the clamping plate to the axle. The conventional axle mount construction, as used with metal leaf springs, cannot be used with composite springs because the rigid axle mount structure produces stress concentrations in the composite spring, particularly in the area where the edges of the clamping members engage the spring and the stress concentrations can result in premature failure of the spring.

In addition to preventing stress concentrations in the composite spring, an axle mount construction must also retain the spring in a fixed position relative to the axle under normal conditions of use. Movement of the composite leaf spring relative to the axle, or other frame member, in a direction longitudinal of the leaf spring can chyange the pivot point of the leaf spring and consequently alter the spring rate. In addition, longitudinal movement of one of the leaf springs of the vehicle will cause the axle to move out of perpendicular relation with the fore-aft centering of the vehicle, resulting in a "dog tracking" condition. Fixing the composite spring to the clamping mechanism by inserting one or more bolts through holes in the leaf spring is not a satisfactory solution for the holes sever the fibrous reinforcement and thus reduce the mechanical properties of the spring.

U.S. Pat. Nos. 4,519,590 and 4,684,110 are directed to axle mount constructions for a composite spring in which the spring is surrounded by a channel-shaped rubber or resilient insert, and the insert in turn is clamped between a pair of metal clamping members. The construction of the aforementioned patents enables the composite spring to be secured to the axle without substantially adversely affecting the mechanical properties of the composite spring.

SUMMARY OF THE INVENTION

The invention is directed to an improved axle mount construction for a composite leaf spring. In a preferred form of the invention, the axle mount construction includes a pair of metal clamping members, one of which is channel-shaped in cross section, being composed of a web and a pair of side walls that define a longitudinal channel. Flanges extend laterally from the side walls of the channel member and are disposed flat wise against the side edges of the second generally flat clamping member.

Positioned within the channel member is a pair of channel-shaped resilient inserts which in combination define a longitudinal passage that receives the central portion of the composite leaf spring. The side walls of the channel-shaped metal clamping member and the corresponding side walls of the inserts have mating concavities.

The web of the channel-shaped clamping member, as well as the clamping plate, are provided with elongated, laterally extending openings and the outer surfaces of the webs of the resilient inserts have similarly shaped projections which are recieved in the openings. The engagement of the projections with the openings acts to resist relative longitudinal movement of the inserts and spring relative to the clamping members.

As a feature of the invention, the resilient inserts project longitudinally beyond the corresponding ends of the clamping members and are tapered or feathered inwardly toward the leaf spring. The feathered ends of the inserts maintain a constant engagement with the spring surfaces during flexing of the spring and prevent dirt or foreign material from entering the clamping mechanism which could set up stress concentrations that could result in premature failure of the spring.

DESCRIPTION OF THE DRAWINGS

The drawings illustrate the best mode presently contemplated of carrying out the invention.

In the drawings.

DESCRIPTION OF THE ILLUSTRATED EMBODIMENT

Figure 1:
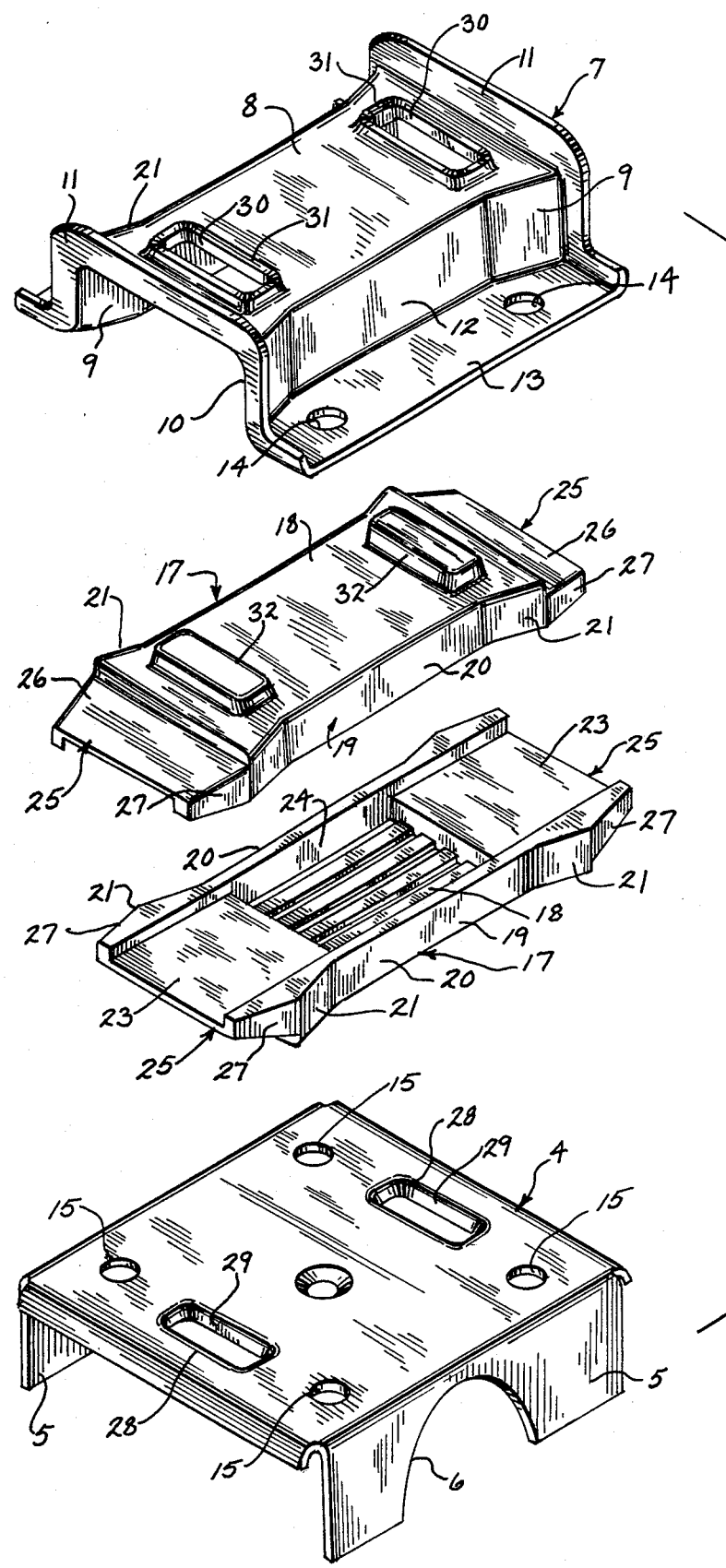
FIG. 1 is an exploded view of the spring and axle mount construction of the invention.
Figure 2:
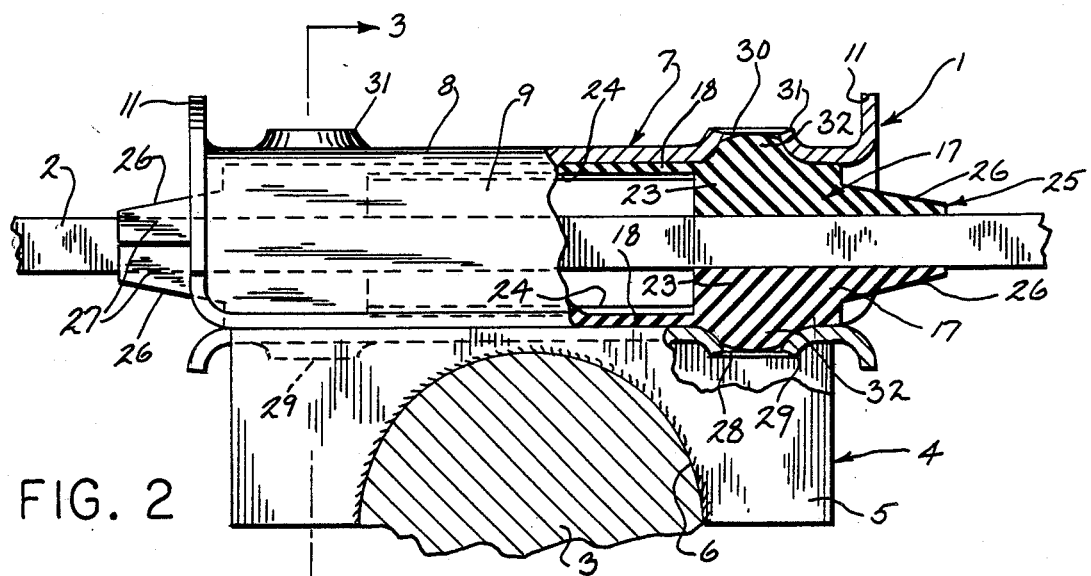
FIG. 2 is a longitudinal section of the axle mount construction as connected to the spring.
Figure 3:
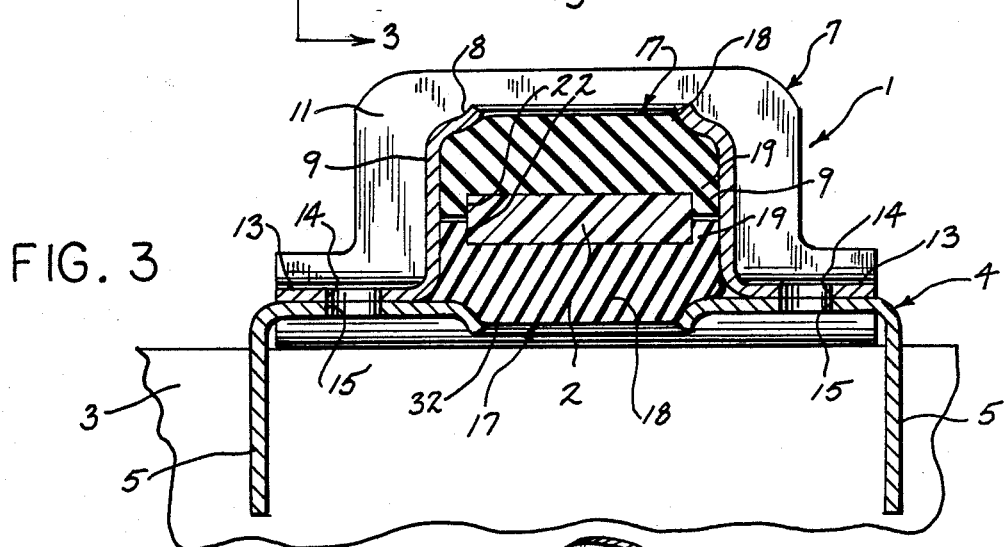
FIG. 3 is a transverse section taken along line 3—3 of FIG. 2.

The invention relates to an improved axle mount construction for a fiber reinforced resin leaf spring. As illustrated in the drawings the axle mount structure 1 is designed to secure the composite leaf spring 2 to the axle 3 of a vehicle. In normal usage the elaf spring will extend transversely of axle 3, but in certain applications the leaf spring may extend transversely of the vehicle in which case the leaf spring could be attached to other mounting elements on the frame.

Mounting structure 1 includes a generally flat metal clamping plate 4 and opposite side edges of plate 4 are provided with downwardly extending flanges 5 having generally concave or semicircular cut-outs 6 which are adapted to be welded to the axle 3.

In addition to clamping plate 4, mounting structure 1 includes an upper channel-shaped metal clamping member 7 that is composed of a central web 8 and a pair of side walls 9 which extend downwardly in spaced relation from web 8. The U-shaped configuration of clamping member 7 defines a longitudinally extending channel 10. End flanges 11 extend upwardly from opposite ends of clamping member 7.

The ends of side walls 9 diverge outwardly from each other thereby forming an inwardly extending concavity in each side wall and providing clamping member 8 with a narrowed central section or waist 12.

Extending laterally from the lower edge of each side wall 9 is a flange 13 and each flange 13 is provided with a pair of holes 14 which are aligned with hoesl 15 in clamping plate 4. Bolts, not shown, are adapted to be inserted through the aligned holes 14 and 15 to clamp the structure 1 securely to axle 3.

Resilient rubber-like insets 17 are located in channel 10 and surround leaf spring 2. Each insert 17 is composed of a central web 18 and a pair of sides 19 which extend outwardly from the web. As best shown in FIG. 1, each side 19 is provided with a concavity or narrow waist 20 which mates with the narrow waist 12 of clamping member 8. The ends of the sides 19 diverge outwardly, as indicated by 21 and mate or complement the ends of the side walls 9 of clamping member 7.

The inner surfaces of sides 19 of inserts 17 are generally parallel and define channels 22 which receive the leaf spring 2.

The inner surface of the web 18 of each insert 17 is provided with a pair of generally rectangular pad 23. Pads 23, as illustrated in FIG. 1, are spaced longitudinally apart and are separated by a central depression 24. Pads 23 are adapted to engage the upper and lower surfaces, respectively, of the spring 2.

The ends 25 of each insert 17 project longitudinally beyond the clamping members 4 and 7 and are tapered or feathered both longitudinally inward as well as vertically. More particularly, the ends of each web 18 are tapered inwardly toward spring 2, as indicated by 26, and similarly each side 19 is tapered laterlly inward, as indicated by 27.

The tapered ends 26,27 of inserts 17 provide a thin flexible section which will engage or hug the leaf spring 2 and flex with the spring to thereby prevent dirt or foreign material from entering the clamping mechanism. If foreign material should enter the clamping mechanism it could set up stress concentrations in the composite spring which would ultimately result in premature failure of the spring.

Clamping plate 4 is provided with a pair of laterally elongated openings 28, each of which is bordered by a downwardly extending flange 29, while the web 8 of clamping member 8 is provided with a similar pair of elongated, laterally extending openings 30 each of which is bordered by an upstanding flange 31.

The webs 18 of inserts 17 are formed with outwardly extending projections or ridges 32 having a shape to be received within the corresponding openings 28 and 30. The engagement of projections 32 with openings 28 and 30 prevents relative movement or shifting of the inserts 17 and spring 2 relative to the clamping members 4 and 7.

The mounting construction of the invention provides a positive lock of the leaf spring to the axle or other mounting structure on the vehicle. The mounting structure is "friendly" to the composite spring, enabling the spring to flex in normal usage without stress concentrations being set up in the spring and at the same time preventing relative longitudinal movement of the spring with respect to the clamping mechanism.

Figure 4:
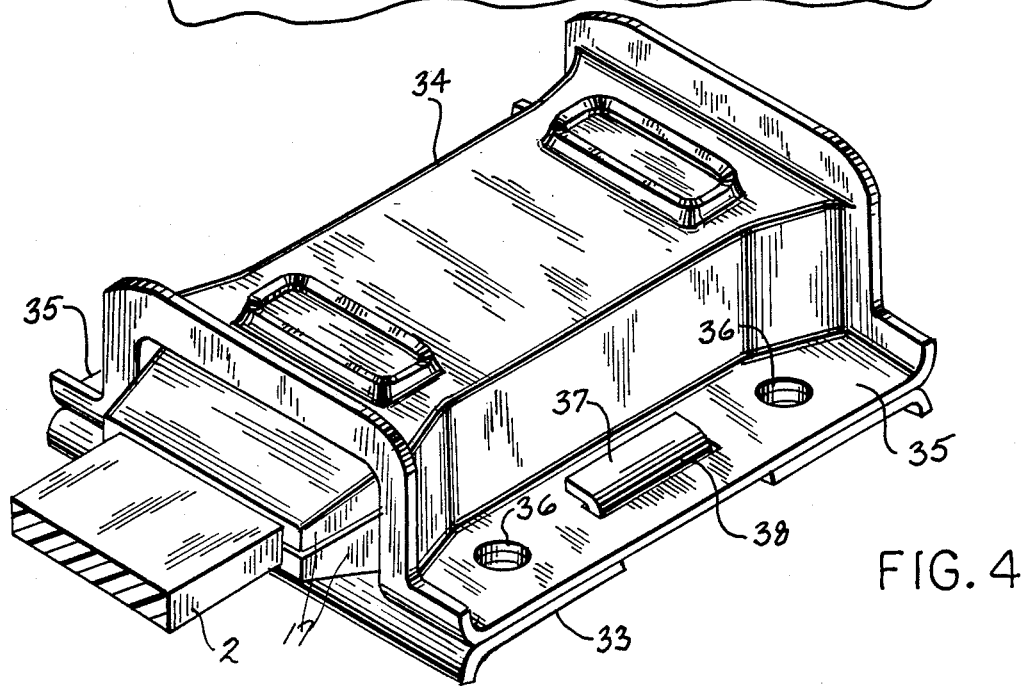
FIG. 4 is a perspective view of a modified form of the clamping mechanism in which the clamping members have interlocking tabs.

FIG. 4 illustrates a modified form of the invention in which the clamping members have interlocking elements which enables the clamping members to be preassembled. More particularly the clamping structure as shown in FIG. 4 includes a generallyflat clamping plate 33 and an upper clamping member 34 having a generally U-shape configuration. Clamping member 34 is provided with a pair of laterally extending flanges 35 which are disposed flatwise against the sides of clamping plate 33. As in the case of the first embodiment the flanges 35 and clamping plate 33 have aligned openings 36 to bolts.

The opposite side edges of clamping plate 33 are provided with tabs 37, while the flanges 35 of clamping member 34 are formed with slots 38. Tabs 37 are adapted to be bent upwardly and extended through the slots 38, as shown in FIG. 4, to secure the clamping member 34 to clamping plate 33.

Resilient inserts, suchas 17, are mounted within the clamping members 33 and 34 and surround the leaf spring 2 as previously described.

With the construction shown in FIG. 4 the clamping members 33 and 34, along with the inserts 17 and spring 2 can be preassembled, and the preassembled unit can then be attached to a clamping pad, or other mounting member on the axle, thorugh the use of bolts. The preassembled unit facilitates the assembly of the axle mount structure to the vehicle.

Various modes of carrying out the invention are contemplated as being within the scope of the following claims particularly pointed out and distinctly claiming the subject matter which is regarded as the invention.

I claim:

1. A mounting construction for attaching a fiber reinforced resin leaf spring to a vehicle, comprising a pair of clamping members defining a longitudinal channel, resilient insert means disposed within the channel and defining a longitudinal passage, a fiber reinforced resin leaf spring disposed within the passage, at least one outer surface of said insert means means having an undulation and a corresponding inner surface of one of said clamping members having a similar undulation to mate with the undulation of said insert means, at least one of said clamping members having an opening extending therethrough and elongated in a lateral direction, said opening being bordered by a flange that extends in a direction away from said spring, and a laterally elongated projection on said insert means and disposed in the opening to resist relative longitudinal movement between said clamping members and said insert means.

2. The construction of claim 1, wherein a first of said clamping members is a clamping plate and a second of said clamping members is generally U-shaped in cross section and is provided with a pair of laterally extending flanges disposed flatwise to the side edges of said plate.

3. A mounting construction for mounting a fiber reinforced resin leaf spring to a vehicle, comprising a clamping plate, a clamping member having a generally U-shaped cross section and composed of a central web and a pair of side walls extending from opposite sides of said web, said web and side walls defining a longitudinal channel, said clamping member also having a pair of laterally extending first flanges extending laterally from said side walls and disposed flatwise against said plate, at least one side wall of said clamping member having a longitudinally extending undulation, a pair of resilient inserts disposed within said channel, each insert having a central web and a pair of side walls, said inserts in combination defining a longitudinally extending passage, a fiber reinforced resin leaf spring disposed within said passage, the outer surfaces of the side walls of the inserts having undulations to mate with the undulations on said clamping member, the web of said clamping member having a laterally elongated opening extending therethrough, said opening being bordered by a second outwardly extending flange, and laterally elongated projection on the web of one of said inserts and disposed within said opening.

4. The construction of claim 3, wherein said clamping plate has an opening therein and the web of the other of said inserts has a projection disposed within the opening of said clamping plate.

5. The construction of claim 3, and a pair of longitudinally spaced support pads disposed on the inner surface of the web of each insert and disposed in flatwise contact with the resepctive upper and lower surfaces of the leaf spring.

6. The consturction of claim 3, wherein each second flange is connected to the clamping member by a generally curved surface.

7. The construction of claim 3, and including interlocking means on the first flange of said clamping member and on said clamping plate to lock said clamping member and clamping plate together.

8. The construction of claim 3, wherein opposite ends of said clamping plate are provided with downwardly extending parallel third flanges, each third flange having a lower edge formed with a generally concave cut-out to receive a vehicle axle.

9. The construction of claim 8, wherein said first flange and said clamping plate having aligned holes, and said construction includes bolt means extending through said holes to attach said clamping plate and clamping member to said axle.

10. A mounting construction for attaching a fiber reinforced resin leaf spring to a vehicle, comprising a pair of clamping members defining a longitudinal channel, resilient insert means disposed within the channel and defining a longitudinal passage, a fiber reinforced resin leaf spring disposed in the passage, at least one outer surface of said isnert having an undulation and a corresponding inner surface of one of said clamping members having a similar undulation to mate with the undulation of said insert, at least one of said clamping members having an opening therein, a projection on said isnert means and disposed in the opening to resist relative longitudinal movement between the clamping members and said insert means, the longitudinal end portions of said insert means projecting beyond the corresponding ends of said clamping members, said projecting end portions being tapered in a vertical direction toward the extremity of said end portions.

11. The construction of claim 10, wherein each projection end portion is also tapered laterally inward toward the extremity of said end portion.

* * * * *

UNITED STATES PATENT AND TRADEMARK OFFICE
CERTIFICATE OF CORRECTION

PATENT NO. : 4,895,350

DATED : January 23, 1990

INVENTOR(S) : WALTER W. SCHOOF ET AL

It is certified that error appears in the above-identified patent and that said Letters Patent is hereby corrected as shown below:

COL. 6, Line 9, CLAIM 10, Delete "isnert" and substitute therefor ---insert means--; Col. 6, line 12, CLAIM 10, After "insert" add ---means---; Col. 6, Line 14, CLAIM 10, Delete "isnert" and substitute therefor ---insert---; Col. 6, Line 22, CLAIM 11, Delete "jection" and substitute therefor ---jecting---

Signed and Sealed this

Twentieth Day of August, 1991

*Attest:*

HARRY F. MANBECK, JR.

*Attesting Officer*     *Commissioner of Patents and Trademarks*